United States Patent [19]
Nishimura

[11] Patent Number: 4,661,659
[45] Date of Patent: Apr. 28, 1987

[54] WIRELESS PHONE SYSTEM COMMUNICATIVELY COMBINED WITH A COMPUTER

[75] Inventor: Kosuke Nishimura, Yamatokouriyama, Japan

[73] Assignee: Sharp Kabushiki Kaisha, Osaka, Japan

[21] Appl. No.: 882,031

[22] Filed: Jul. 7, 1986

Related U.S. Application Data

[63] Continuation of Ser. No. 554,384, Nov. 22, 1983, abandoned.

[30] Foreign Application Priority Data

Nov. 30, 1982 [JP] Japan ................. 57-211566

[51] Int. Cl.$^4$ ................... H04M 11/00; H04Q 7/04
[52] U.S. Cl. ............................ 379/61; 379/63; 379/93
[58] Field of Search ............ 179/2 C, 2 DP, 2 EA; 375/5

[56] References Cited
U.S. PATENT DOCUMENTS

| | | | |
|---|---|---|---|
| 3,976,840 | 8/1976 | Cleveland et al. | 179/2 DP |
| 4,068,095 | 1/1978 | Ghormley et al. | 179/2 DP |
| 4,131,849 | 12/1978 | Freeburg et al. | 375/5 |
| 4,268,721 | 5/1981 | Nielson et al. | 179/2 C |
| 4,280,020 | 7/1981 | Schnurr | 179/2 EA |
| 4,392,022 | 7/1983 | Carlson | 179/2 EA X |
| 4,414,661 | 11/1983 | Karlstrom . | |
| 4,430,742 | 2/1984 | Milleker et al. | 375/5 |
| 4,442,318 | 4/1984 | Derochers | 179/2 C |
| 4,481,382 | 11/1984 | Villa-Real | 179/2 EA |
| 4,508,935 | 4/1985 | Mastromoro | 179/2 EA |

*Primary Examiner*—Keith E. George
*Attorney, Agent, or Firm*—Birch, Stewart, Kolasch & Birch

[57] ABSTRACT

A wireless phone system comprises a master phone unit connectable to a telephone line, and a wireless phone receiver connectable to the master phone unit, the wireless phone receiver comprising a computer circuit for processing data as a computer, a wireless circuit for wirelessly transmitting information including the computer data, microphone means for inputting sound information, speaker means for outputing the sound information, and switching means for selecting whether the microphone means and the speaker means are connected with the computer circuit, or not. The master phone unit has a computer circuit.

1 Claim, 9 Drawing Figures

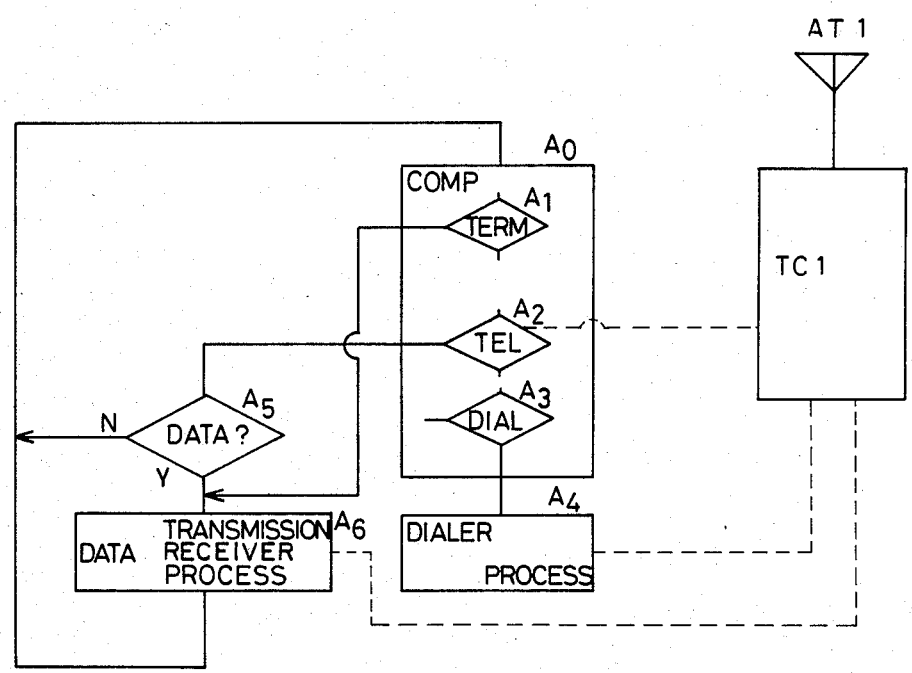
FIG.(6)

WIRELESS PHONE SYSTEM COMMUNICATIVELY COMBINED WITH A COMPUTER

This application is a continuation of application Ser. No. 554,384 filed on Nov. 22, 1983 and now abandoned.

BACKGROUND OF THE INVENTION

The present invention relates to a wireless phone system combined with a computer, and more particularly, to a wireless computer phone receiver capable of being connected to a master computer unit without using a specific coupler.

A conventional hand-held computer is easy to carry. However, the size and the number of an Large Scale Integrated Circuits (hereinafter referred to as an LSI), which is packaged into a hand-held computer are limited, so a lack of memory capacity in LSI occurs. Therefore, the function and processing ability of the computer are inevitably limited.

Conventionally, to eliminate the above problems, the hand-held computer is connected to a main computer through a telephone line for a data communication. But, in this situation, a specific coupler for connecting the hand-held computer and the main computer through the telephone line is required, so that the hand-held computer becomes difficult to carry.

SUMMARY OF THE INVENTION

An object of the present invention is to provide a wireless phone system communicatively combined with a computer.

Another object of the present invention is to provide a wireless computer phone receiver which functions as a hand-held computer, capable of being connected with a master computer unit through a telephone line without using a specific coupler.

Still another object of the present invention is to provide a wireless computer phone receiver which functions as a hand-held computer, capable of being connected with a master computer through a telephone line and alternatively capable of wireless communication with a master computer unit.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a wireless phone receiver comprises a computer circuit for processing data as a computer, a wireless circuit for wireless transmission of information, including computer data, microphone means for inputting sound information, speaker means for outputting sound information, and switching means for selecting whether the wireless receiver is placed in a telephone mode or in a data processing mode. The microphone means and the speaker means are used as a microphone and a speaker of an acoustic coupler when the wireless phone receiver is used to communicate computer data through a telephone line.

According to an alternative embodiment of the present invention, a wireless phone system comprises a master phone unit connectable to a telephone line, a wireless phone receiver connectable to the master phone unit, a wireless phone receiver comprising a computer circuit for processing data as a computer, a wireless circuit for wireless transmission of information, including computer data, microphone means for inputting sound information, speaker means for outputting sound information, and switching means for selecting whether wireless phone receiver is placed in a telephone mode or in a data processing mode. The master phone unit has a computer circuit. The master phone unit and the wireless phone receiver are alternatively connected through a telephone line or by wireless connection.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 5 and 6 are flowcharts of each of the operations of the master computer unit B and the wireless computer phone receiver A, respectively.

DETAILED DESCRIPTION OF THE INVENTION

Figure 1:
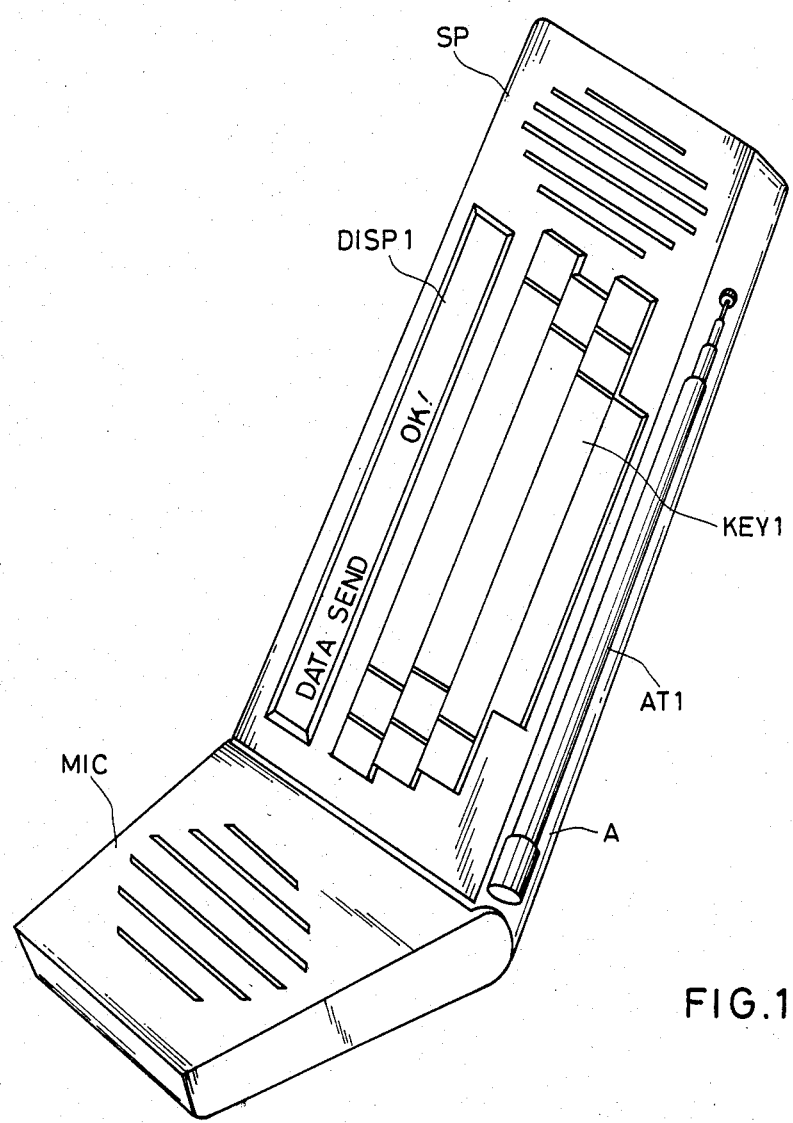
FIG. 1 is a perspective view of a wireless computer phone receiver according to an embodiment of the present invention.

FIG. 1 is a perspective view of a wireless computer phone receiver A according to an embodiment of the present invention. A wireless phone system comprises a wireless computer phone receiver A and a master computer unit B (as shown in FIG. 2(b)).

A wireless computer phone receiver A comprises a speaker SP, a microphone MIC, an antenna AT1, a display DISP1 and a keyboard KEY1. Further, a computer circuit CC1 (in FIG. 4(a)), and a wireless circuit TC1 (in FIG. 4(a)) are provided in the wireless computer phone receiver A.

When used as a telephone, a speaker SP and a microphone MIC are used as in a conventional a phone receiver. If the receiver is used to communicate computer data through a telephone line to the master computer unit, the speaker SP and the microphone MIC are used as a conventional acoustic coupler. When used as a hand-held computer, the speaker SP outputs sound or voice responsive to the computer circuit CC1, and the microphone MIC inputs sound or voice to the computer circuit CC1.

The antenna AT1 is provided for wireless connection of the wireless computer phone receiver A with the master computer unit B. The wireless computer phone receiver A functions as a telephone via the antenna AT2. Further, the antenna AT1 is operated to communicate computer data between the wireless computer phone receiver A and the master computer unit B through AT2.

The display DISP1, for example, a liquid crystal cell, displays character or numerical output data from the computer circuit CC1, or input data from the keyboard KEY1, or data wirelessly transmitted from the master computer unit B to the wireless receiver, or data transmitted from the master computer unit B through a telephone line. The keyboard KEY1 is operated to input information into the computer circuit CC1, input data for wireless transmission into the master computer unit B, or input data for transmission to the master computer unit B through the telephone line.

Figure 2A:
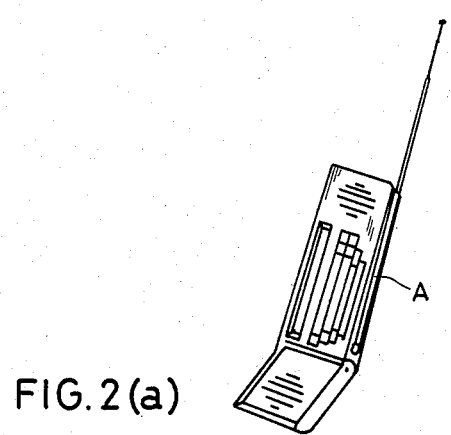
FIGS. 2(a) and 2(b) are perspective views of the wireless computer phone receiver A of FIG. 1 and a master computer unit B, respectively.
Figure 2B:
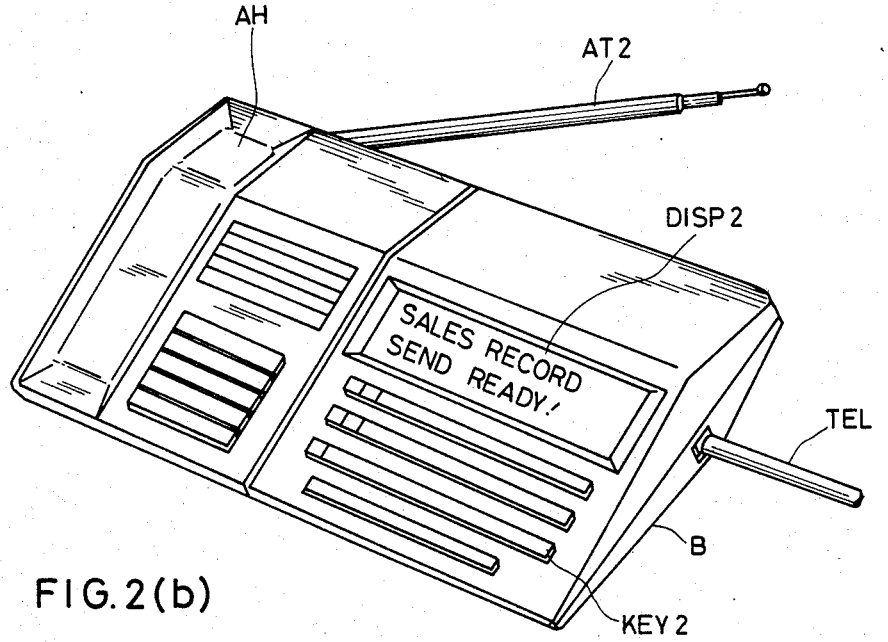

FIGS. 2(a) and 2(b) are perspective views of the wireless computer phone receiver A of FIG. 1 and the master computer unit B, respectively.

The master computer unit B comprises an antenna AT2 for wireless connection of the wireless computer phone A and the master computer unit B, a display DISP2, such as a liquid crystal display cell, a keyboard KEY2, a holder AH for holding the wireless computer phone A thereon. Also, the master computer unit B includes a computer circuit CC2 (in FIG. 4(b)), a circuit TEC for telephone, (in FIG. 4(b)), and a wireless circuit TC2 (in FIG. 4(b)). Also the master computer unit B is connected with a telephone line TEL.

The display DISP2 can display output data from the computer circuit CC2, input data from the keyboard KEY2, data by wireless transmission from the wireless computer phone receiver A, and data transmitted from the wireless computer phone receiver A through a telephone line.

The keyboard KEY2 inputs information into the computer circuit CC2, inputs data for wireless transmission into the wireless computer phone receiver A, inputs data for transmission to the wireless computer phone receiver A.

The antenna AT2 is provided for wireless connection of the wireless computer phone receiver A with the master computer unit B.

Figures 3A, 3B:
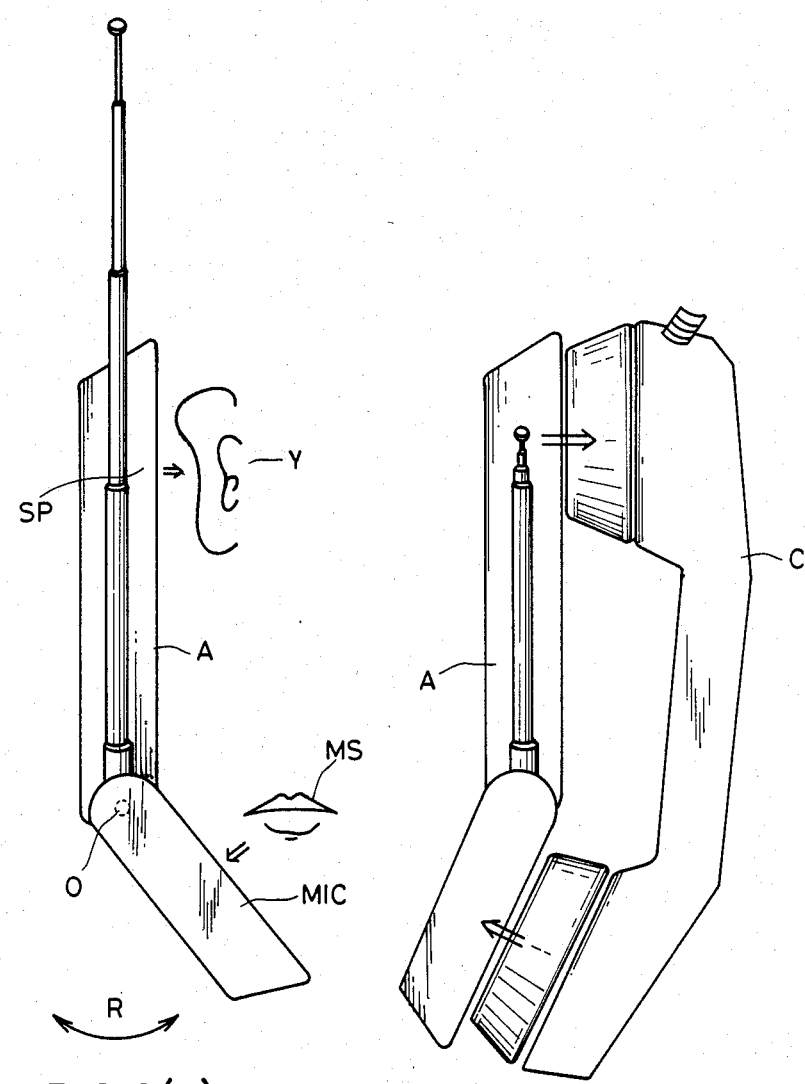
FIG. 3(a) is a side view of the wireless computer phone receiver A according to an embodiment of the present invention when used as a telephone.
FIG. 3(b) is a side view of the wireless computer phone receiver A according to an embodiment of the present invention when used to communicate computer data by a telephone line.

FIG. 3(a) shows a side view of the wireless computer phone receiver A (when used as a telephone) according to an embodiment of the present invention.

In the embodiment of FIGS. 3(a) and 3(b), the speaker SP and the microphone MIC are provided on both sides of the wireless computer phone receiver A. Y designates an ear of an operator and MS designates the mouth of an operator.

Part of the wireless computer phone receiver A functioning as the microphone MIC is folded around the point O in the directions of arrows R, so that the wireless computer phone receiver A can be bent double and locked in position with an appropriate device.

When the wireless computer phone receiver A is communicatively connected with the master computer unit B through a telephone line, the speaker SP and the microphone MIC of the wireless computer phone receiver A are fitted with a microphone and a speaker of a conventional phone receiver C as shown in FIG. 3(b).

Figure 4B:
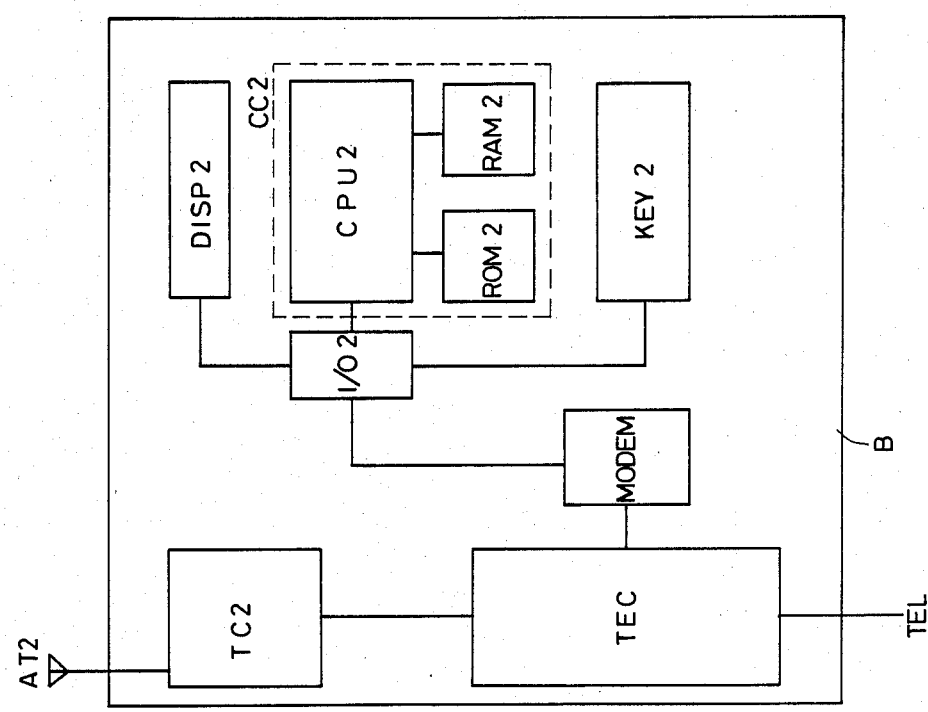
FIGS. 4(a) and 4(b) are block diagrams of the wireless computer phone receiver A and the master computer unit B according to the present invention, respectively.
Figure 4A:
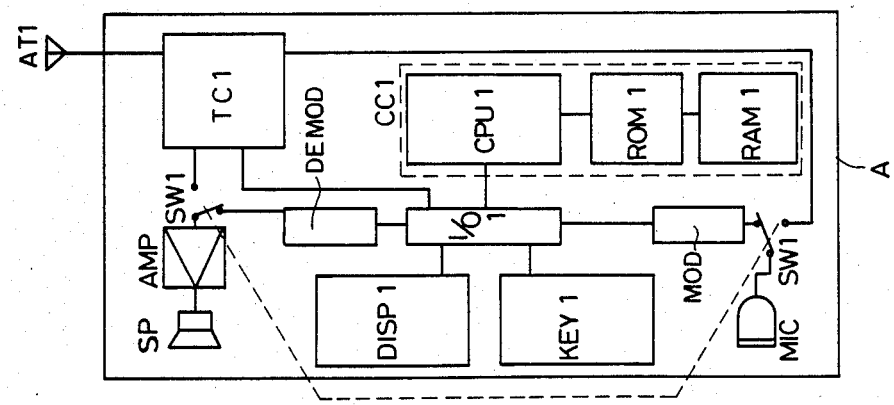

FIGS. 4(a) and 4(b) are block diagrams of the wireless computer phone receiver A and the master computer unit B according to an embodiment of the present invention.

In FIG. 4(a), the wireless circuit TC1 is connected with the antenna AT1 and is connected with one contact of each of switches SW1 and SW2, and with the computer circuit CC1 through an interface I/O1. An amplifier AMP is provided between the switch SW1 and the speaker SP. The computer circuit CC1 comprises a central processing unit CPU1, a read only memory ROM1, and a random access memory RAM1. The computer circuit CC1 functions as a computer. The display DISP1 and the keyboard KEY1 are operatively connected with the computer circuit CC1 through the interface I/O1. The computer circuit CC1 is connected with the switches SW1 and SW2 through the interface I/O1, in conjunction with a modulator MOD and a demodulator DEMOD. Accordingly, the switches SW1 and SW2 are utilized to connect the, the wireless circuit TC1 with the speaker SP and the microphone MIC to allow the receiver to function in a telephone mode as a conventional telephone receiver. Alternatively, if the switches SW1 and SW2 are selected to be connected with the computer circuit CC1, the computer circuit CC1 is connected with the speaker SP and the microphone MIC in a telephone mode to bidirectionally transmit data between the wireless receiver and the master unit. The switches SW1 and SW2 are operated as related.

In FIG. 4(b), the wireless circuit TC2 is connected with a telephone circuit TEC and the antenna AT2. The telephone circuit TEC is connected with a central processing unit CPU2 of a computer circuit CC2 through a data transmission modem MODEM and an interface I/O2. The computer circuit CC2 comprises a read only memory ROM2, the central processing unit CPU2 and a random access memory RAM2.

The display DISP2 and with the keyboard KEY2 are connected the computer circuit CC2 and the telephone circuit TEC through the interface I/O2. Further, the telephone circuit TEC is connected with a telephone line for telecommunicating with outside sources.

Figure 5:
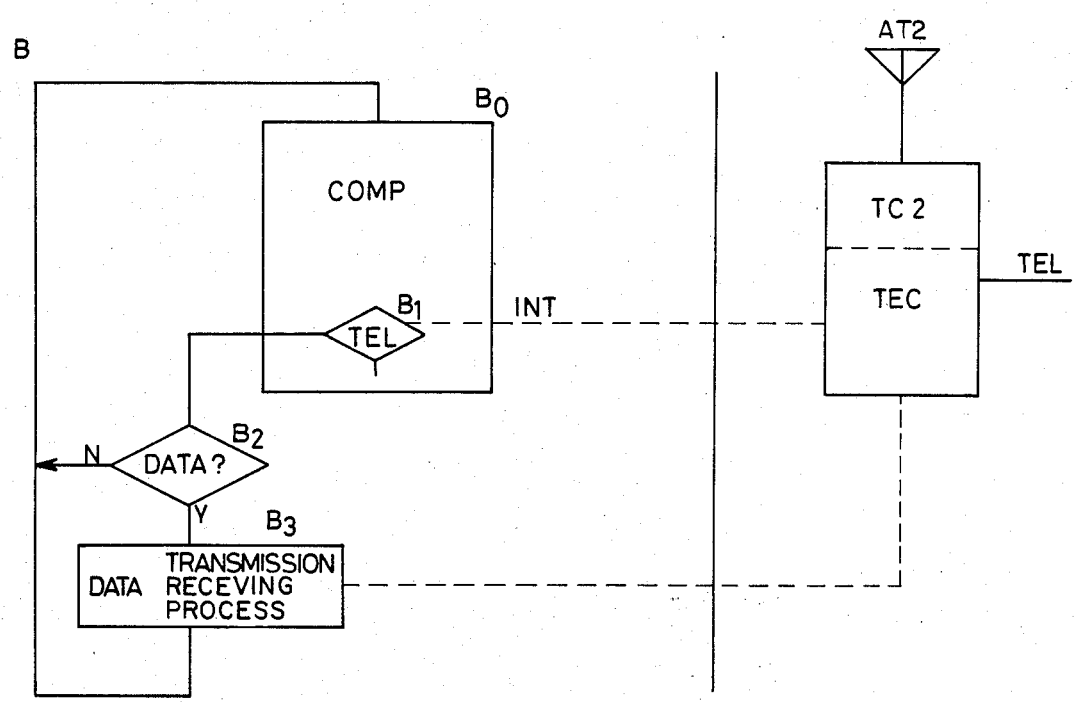

FIGS. 5 and 6 are flowcharts of each of the operations of the master computer unit B and the wireless computer phone receiver A, respectively.

In FIG. 5, B0 designates a computer routine in the computer circuit CC2 signals, which interrupted by the telephone circuit TEC, are judged in step B1 in the computer routine B0. If some telephone call is present, the signals are judged in step B2 whether the signals are in a data format. When the signals are not in the data format, the signals are judged as a voice data. Accordingly control is returned from step B2 to step B0, so that the master computer unit B function as a telephone. When the signals are in the data format, a process of the data transmission or receiving is excuted in step B3.

In FIG. 6, A0 designates a computer routine of the computer circuit CC1 of the wireless computer phone receiver A. Step A1 determines if the wireless computer phone receiver A is used as a data transmission/receiving terminal unit. (Specifically, whether the wireless computer phone receiver A transmits and receives data from the master computer unit B through the telephone line. This decision is made based on whether the switches SW1 and SW2 are activated. Next, in step A2, an interrupt from the wireless circuit TC1 is examined as to whether the signals are present. If so, step A5 is selected to determine whether the signals are in the data format. When these signals are in the data format, the data transmission/receiving process is excuted in step A6. Otherwise, the wireless receiver will perform as a conventional wireless telephone receiver. If these signals are not in the data format, steps A3 and A4 are selected to excute a dialer function if the auto dialer command is executed.

In an alternative embodiment of the present invention, the speaker SP and microphone MIC as shown in FIG. 4(a) may be provided in the master computer unit B.

A further added advantage of the present system is that the wireless computer phone A may be connected with other main computers via the master computer unit B through the telephone line.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A wireless phone system comprising:
   a wireless phone handset for receiving and transmitting voice data and non-voice data;
   a master computer unit connected to a telephone line and including,
     first central processing unit (CPU) means for processing data,
     first keyboard means for inputting non-voice data to said first CPU means,
     telephone circuit means for transferring voice data and non-voice data between said telephone line, said first CPU means, and said wireless phone handset,
     first wireless communication circuit means for effecting transfer of data between said telephone circuit means and said wireless phone handset, and
     first display means for displaying non-voice data from said first CPU means; said wireless phone handset including,
   second CPU means for processing non-voice data,
   second wireless communication circuit means for effecting transfer of data between said handset and said first wireless communication circuit means,
   second keyboard means for inputting said non-voice data to said second CPU means,
   second display means for displaying non-voice data from said second CPU means,
   microphone means for inputting voice data from a user to said second wireless communication means and non-voice data from a conventional phone transceiver to said second CPU means,
   speaker means for outputting voice data from said second wireless communication circuit means and non-voice data from said second CPU means to a conventional phone transceiver, and
   switch means for placing said handset in either a voice data or non-voice data transmission mode.

* * * * *